United States Patent
Yanagishima et al.

(10) Patent No.: US 9,777,823 B2
(45) Date of Patent: Oct. 3, 2017

(54) GEAR DEVICE FOR ELECTRIC MOTOR

(75) Inventors: Yutaka Yanagishima, Kanagawa (JP); Yasuhiro Ootsuka, Kanagawa (JP)

(73) Assignee: Toyo Electric Mfg. Co. Ltd., Chuo-Ku (JP)

(*) Notice: Subject to any disclaimer, the term of this patent is extended or adjusted under 35 U.S.C. 154(b) by 950 days.

(21) Appl. No.: 13/197,932

(22) Filed: Aug. 4, 2011

(65) Prior Publication Data
US 2012/0031228 A1 Feb. 9, 2012

(30) Foreign Application Priority Data
Aug. 5, 2010 (JP) .................. 2010-176062

(51) Int. Cl.
*F16H 57/027* (2012.01)

(52) U.S. Cl.
CPC ........ *F16H 57/027* (2013.01); *Y10T 74/2186* (2015.01)

(58) Field of Classification Search
CPC .... F16H 57/02; F16H 57/027; F16H 57/0416; F16H 2057/02039; F16H 2057/02043; F16H 2057/02034; F16H 61/0003; B60K 17/12; B60K 17/105; B60K 17/00; F16K 15/02; F16K 15/021; F16K 15/06; B65D 51/1616; B65D 51/1633; B65D 51/1638; B65D 51/1644; B65D 51/165; B65D 77/225
USPC ................... 74/600 R–606 A; 137/197, 519; 220/203.01, 202, 203.19, 203.2, 220/367.1–374
See application file for complete search history.

(56) References Cited

U.S. PATENT DOCUMENTS

| | | | | |
|---|---|---|---|---|
| 2,202,123 A | * | 5/1940 | Strode | 137/519 |
| 2,823,694 A | * | 2/1958 | Champion | 137/197 |
| 3,164,141 A | * | 1/1965 | Jones | 137/519 |
| 3,241,537 A | * | 3/1966 | Jones | 123/572 |
| 4,595,118 A | * | 6/1986 | Azuma et al. | 74/606 R |
| 4,794,942 A | * | 1/1989 | Yasuda et al. | 137/197 |
| 5,125,428 A | * | 6/1992 | Rauter | B01D 19/0031 137/199 |
| 5,348,570 A | * | 9/1994 | Ruppert et al. | 96/6 |
| 5,683,372 A | * | 11/1997 | Colacello et al. | 604/333 |

(Continued)

FOREIGN PATENT DOCUMENTS

| | | |
|---|---|---|
| CN | 2342205 Y | 10/1999 |
| JP | 61-035826 Y2 | 10/1986 |

(Continued)

OTHER PUBLICATIONS

JPO Translation of Description and Claims of JP 2009293695 A1, Takehara, Dec. 17, 2009.*

*Primary Examiner* — Daniel Yabut
(74) *Attorney, Agent, or Firm* — Locke Lord LLP; Howard M. Gitten

(57) ABSTRACT

A gear device for electric motor 1 which is combined with an electric motor installed in a vehicle, wherein a breather pathway 8 is provided in a gear box 2 where a row of gears for transmitting force of the electric motor is contained, the breather pathway connecting between an inside and outside of the gear box 2, and in the breather pathway 8, a closing valve system 10 is provided to close the breather pathway 8 when an outer pressure of the gear box 2 is lower in comparison to an inner pressure of the gear box 2 exceeding an acceptable range.

4 Claims, 2 Drawing Sheets

(56) References Cited

U.S. PATENT DOCUMENTS

| | | | |
|---|---|---|---|
| 6,016,828 A * | 1/2000 | Machledt | 137/202 |
| 6,447,565 B1 * | 9/2002 | Raszkowski et al. | 74/606 R |
| 7,597,114 B2 * | 10/2009 | Buckingham et al. | 74/606 R |
| 8,276,479 B2 * | 10/2012 | Shinbo | 74/606 R |
| 2003/0010151 A1 * | 1/2003 | Johnson et al. | 74/606 R |

FOREIGN PATENT DOCUMENTS

| | | |
|---|---|---|
| JP | 10-196769 A | 7/1998 |
| JP | 2006-038019 A | 2/2006 |
| JP | 2008-106792 A | 5/2008 |
| JP | 2009-293695 A | 12/2009 |

\* cited by examiner

GEAR DEVICE FOR ELECTRIC MOTOR

CROSS-REFERENCE TO RELATED APPLICATION

This application claims priority to Japanese Patent Application No. 2010-176062, filed Aug. 5, 2010. The entire content of the aforementioned patent application is incorporated herein by this reference.

TECHNICAL FIELD

The present invention relates to a gear device which is combined with an electric motor of a vehicle.

BACKGROUND ART

To a drive system of a railroad vehicle, provided is a gear device for reducing speed of and transmitting to an axle, a rotation of an electric motor. The gear device is generally constructed so as to be contained in a gear box to be mounted to a carriage in a state that a small gear of an electric motor side and a big gear of an axle side are engaged with each other. In such a gear device, provided is a breather device for reducing a difference between a pressure of an inside and a pressure of an outside of the gear box. The breather device is a so-called open-type one where the inside and outside of the gear box are connected with each other by a breather pathway (for example, see Patent Literature 1). Also, there is a breather device provided to a crankcase of an internal combustion engine. In the breather device, mounted is a valve system or the like which opens and closes the breather pathway as necessary (for example, see Patent Literature 2).

CITATION LIST

Patent Literature

PTL 1: JP-A-H10-196769
PTL 2: JP-Y2-S61-35826

SUMMARY OF INVENTION

Technical Problem

In a case of the crankcase of the internal combustion engine, an inner pressure of the case represents a pulsatory motion, caused by a reciprocating motion of a piston, and blowby gas from a combustion chamber blows out toward an inside of the case. Due to that, a pressure change often occurs and the amplitude thereof is big. Accordingly, if the crankcase is connected only by the simple open-type breather pathway, leaks of blowby gas and lubricating oil become more serious. Because of that, the valve system is required. On the other hand, with respect to the gear device for electric motor of a vehicle, in the gear box there is no cause to make the pressure change big like the reciprocating motion of the piston and the inflow of the blowby gas. Even if the pressure in the gear box changes caused by the change of a rotation speed of the gear, the frequency of the change of the rotation speed is not so often. Accordingly, with respect to the gear device for electric motor, as the leak of lubricating oil does not become more serious, it is said that the open-type breather pathway is enough. However, as the highest speed of the vehicle increases, a problem by another cause could occur. For example, in a case that vehicles pass each other at a high speed in a tunnel, a pressure in the tunnel descends rapidly from an atmosphere pressure. In this case, an outer pressure of the gear box decreases more rapidly than an inner pressure of the same, and thereby, the lubricating oil in the gear box could leak into the outside of the gear box.

Then, the present invention aims to provide a gear device for electric motor appropriate to a vehicle capable of running at a high speed.

Solution to Problem

A gear device for electric motor of the present invention is a gear device for electric motor which is combined with an electric motor installed in a vehicle, wherein a breather pathway is provided in a gear box where a row of gears for transmitting force of the electric motor is contained, the breather pathway connecting between an inside and outside of the gear box, and in the breather pathway, a closing valve system is provided to close the breather pathway when an outer pressure of the gear box is lower in comparison to an inner pressure of the gear box exceeding an acceptable range.

In one aspect of the present invention, the closing valve system may be constructed so that the closing valve system includes a valve chamber provided in the breather pathway and a valve body contained within the valve chamber so as to move vertically, and the closing valve system is constructed so that when the valve body descends in the valve chamber by its own weight, a front and back of the valve chamber are connected via an aperture between the valve body and the valve chamber, and when the outer pressure is lower in comparison to the inner pressure exceeding the acceptable range, the valve body ascends in the valve chamber to close the breather pathway. In addition, a filter may be further provided in the breather pathway so as to be located at an outside of the gear box more outward than a location closed by the closing valve system.

Advantageous Effects of Invention

According to the present invention, when the outer pressure of the gear box is lower in comparison to the inner pressure of the gear box beyond an acceptable range, the breather pathway is closed by the closing valve system. Because of that, in such a case that vehicles, both running at a high speed, pass each other in a tunnel, in response to descent of pressure within a tunnel, the closing system is made close the breather pathway. Thereby, it is possible to prevent a leak of lubricating oil within the gear box.

DESCRIPTION OF EMBODIMENTS

Figure 1:
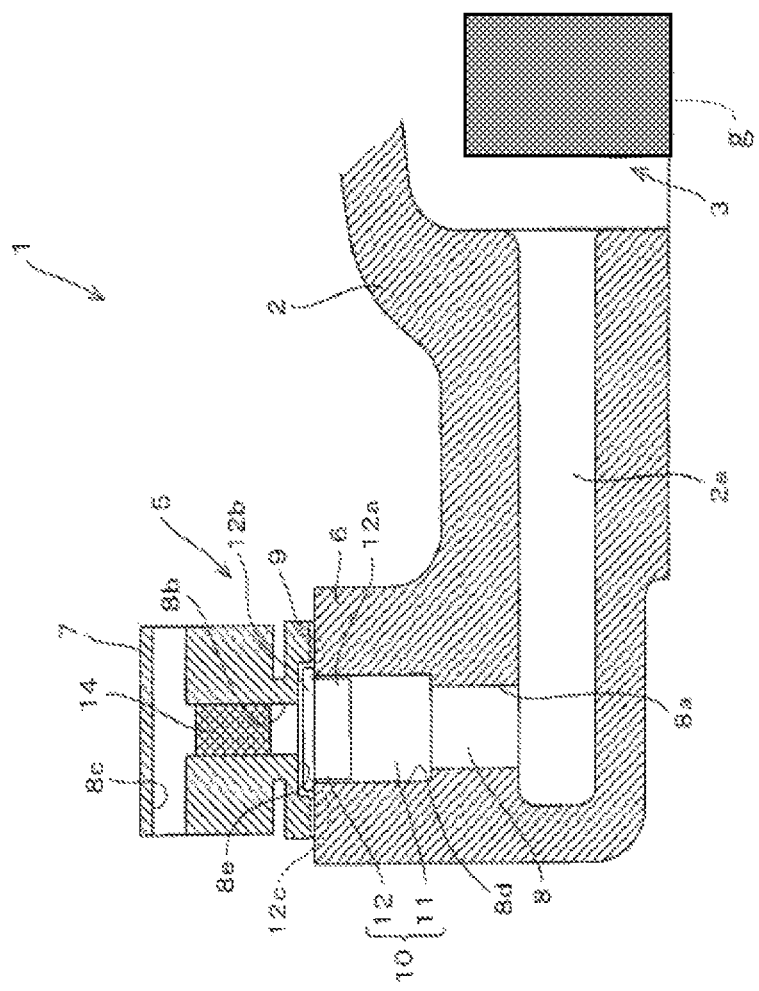
FIG. 1 is a sectional view showing a substantial part of a gear device for electric motor as one embodiment of the present invention.

FIG. 1 is a diagram showing a substantial part of a gear device for electric motor (hereinafter, sometimes called simply "the gear device") as one embodiment of the present invention. This gear device 1 reduces speed of a rotation of an electric motor as a motor for drive of railroad vehicle, and transmits the rotation. The gear device 1 has a gear box 2. The gear box 2 is mounted to a carriage of the railroad vehicle. A vertical direction at the moment of mounting the gear box 2 is almost equal to a vertical direction in FIG. 1. Although the gear box 2 is constituted by combining a main body and a cap member, only the cap member is shown in FIG. 1. In a gear chamber 3 within the gear box 2, a row of gears "g" is contained. The row of gears "g" is constructed, for example, by engaging a small gear connected to a electric motor side and a big gear connected to an axle side. Although an input axle to transmit a rotation from the electric motor to the small gear, and an axle to be concentrically combined to the big gear are mounted to the gear box 2 so as to penetrate the main body respectively, they are not shown in the drawings. Each of the portions which the axle members penetrate is sealed appropriately. Lubricating oil for the row of gears "g" is supplied to the gear chamber 3.

In the upper portion of the gear box 2, a void portion 2a is provided so as to extend laterally. Above the void portion 2a, breather device 5 is provided. The breather device 5 has a base portion 6, a breather cap 7, and a breather pathway 8. The base portion 6 is formed integrally with the upper portion of the gear box 2. The breather cap 7 is fixed to the base portion 6. The breather pathway 8 extends so as to penetrate the base portion 6 and the breather cap 7, and one end thereof opens at the void portion 2a and the other end thereof opens at an outer portion of the breather cap 7. The breather pathway 8 includes a first pathway 8a extending vertically in the base portion 6, a second pathway 8b extending vertically in the breather cap 7, and a third pathway 8c extending horizontally from an upper end of the second pathway 8b. However, the formation of the breather pathway 8 is just an example, the construction of flow paths of the breather pathway 8 can be changed appropriately.

An aperture of connected surfaces between the base portion 6 and the breather cap 7 is sealed with packing 9. In an inside of the packing 9, a closing valve system 10 is provided. The closing valve system 10 includes a float chamber (a valve chamber) 11 and a float (a valve body) 12 contained in the float chamber 11. The float chamber 11 is constructed by combining an enlarged portion 8d which is an upper portion of the first pathway 8a and an enlarged portion 8e which is a lower portion of the second pathway 8b.

Figure 2:
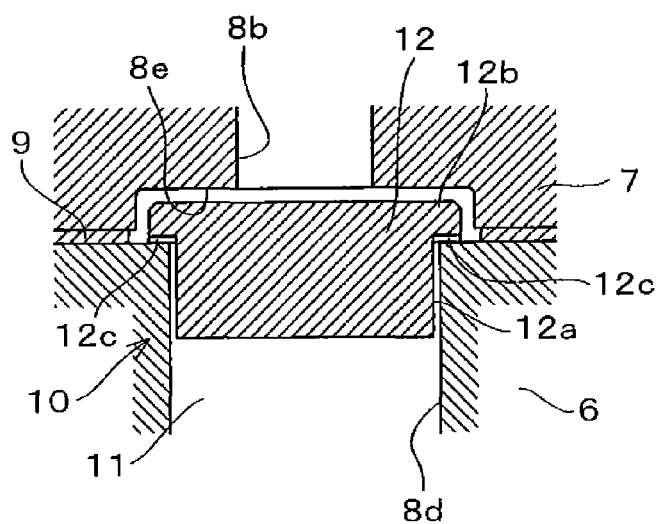
FIG. 2 is a partial enlarged view showing a state that a closing valve system opens.

As shown enlarged in FIG. 2, the float 12 has a float axis 12a entering the enlarged portion 8d, and a flange 12b provided so as to be enlarged outward in a diameter direction from an upper end of the float axis 12a. An outer diameter of the float axis 12a is smaller than an inner diameter of the enlarged portion 8d. The flange 12b is capable of connecting closely to an upper surface of the base portion 6, and an airflow slit 12c is formed at a bottom surface of the flange 12b. An outer diameter of the flange 12b is smaller than an inner diameter of the enlarged portion 8e, and a vertical depth of the flange 12b is smaller than a vertical depth of the enlarged portion 8e.

Returning to FIG. 1, provided is a filter 14 above the float 12 in the second pathway 8b, that is, at a outer position beyond the float 12 when seen from the inside of the gear box 2. The filter 12 is provided for catching and suppressing flowing-out of mist component of lubricating oil included in airflow from the gear chamber 3.

Figure 3:
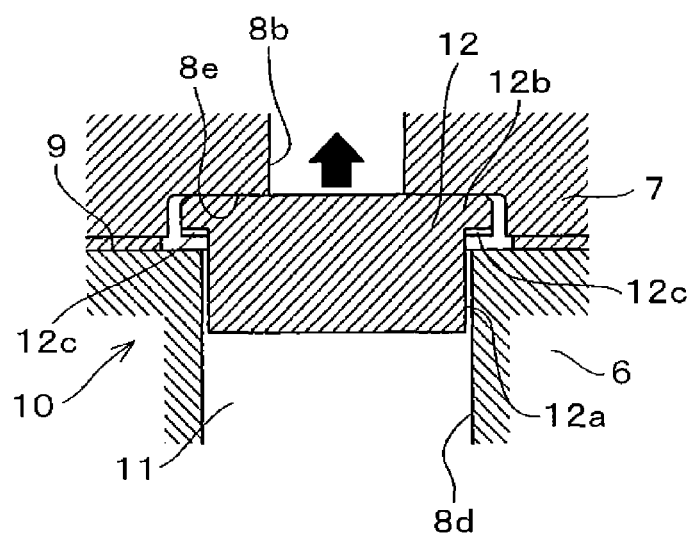
FIG. 3 is a partial enlarged view showing a state that a closing valve system closes.

In such a gear device 1, when the pressure of inside of the gear box 2 is equal to the pressure of outside of the gear box 2, the float 12 descends by its own weight. Thereby, as shown in FIG. 2, the flange 12b of the float 12 connects closely to the base portion 6. In this state, the first pathway 8a and the second pathway 8b go through each other via an aperture between the float 12 and the float chamber 11, concretely speaking, an aperture of outer circumference of the float axis 12a, the airflow slit 12c, and apertures of outer circumference and above upper surface of the flange 12b. Accordingly, airflow is possible between the inside and outside of the gear box 2 via the breather pathway 8. When the outer pressure of the gear box 2 is lower than the inner pressure of the gear box 2, a force of making the float 12 ascend (referred to as "the floatation") occurs in accordance to a pressure difference between the inside and outside of the gear box 2. However, in a range that the floatation does not exceed the weight of the float 12 itself, the float 12 is held at a position shown in FIG. 2. In this state, kept is a function of reducing a pressure difference between the inside and outside of the gear box 2 via the breather pathway 8. On the other hand, in a case that the floatation affecting the float 12 exceeds a downward force by the its own weight, the float 12 ascends as indicated with an arrow shown in FIG. 3. Thereby, the upper surface of the flange 12b connects closely to the upper surface of the expanded portion 8e of the second pathway 8b (the upper surface of the float chamber 11). Thereby, the breather pathway 8 is closed between the first pathway 8a and the second pathway 8b, and it can be avoided that the pressure is vented from the inside to the outside of the gear box 2. Accordingly, there could be removed a worry that the mist component of the lubricating oil in the gear box 2 leaks into the outside of the gear box 2 via the breather pathway 8.

The pressure difference at a moment when the float 12 closes the breather pathway 8 (an affecting pressure to the float 12) can be set appropriately, so that, as long as the difference pressure between the inside and outside of the gear box 2 is within the acceptable range, maintained is a state that the airflow is possible via the breather pathway 8, and when the pressure difference exceeds the acceptable range, that is, when the outer pressure descends exceeding the acceptable range further than the inner pressure, the float 12 ascends to close the breather pathway 8. For example, in order to avoid a leak of lubricating oil at a moment when the vehicle having the gear device 1 and the other vehicle pass each other in a tunnel while running at a high speed range exceeding a predetermined limit (for example, not less than 300 km/h), an amount of descent of the pressure in the tunnel, the pressure occurring at the moment of passing each other, is measured or estimated, and the affecting pressure to the float 12 may be set so that the float 12 closes the breather pathway 8 with the pressure difference smaller than the pressure difference between the inside and outside of the gear box 2, which could occur together with the descent of the pressure.

According to the above mentioned gear device 1, the filter 14 is located at an outer position of the gear box 2 beyond a position where the breather pathway 8 is closed by the float 12, that is, a position where the flange 12 is connected to the upper surface of the expanded portion 8e. Accordingly, even if the outer pressure of the gear box 2 descends more rapidly than the inner pressure of the gear box 2, and the mist component of lubricating oil in the gear box 2 flows into the breather pathway 8, as the breather pathway 8 is closed by the float 12, it could not happen that the filter 14 has to receive a big mount of mist component. Thereby, it is possible to suppress a progress of clogging of the filter 14. Therefore, it is possible to prolong a cycle of exchange and/or maintenance for the filter 14.

The present invention is not limited only to above mentioned embodiment, but also can be executed in a various embodiments. For example, it is not necessary to mount the filter 14. The closing valve system 10 can be constituted in such a way that the whole of the closing valve system 10 is contained in either one of the base portion 6 or the breather cap 7. Instead of or in addition to the airflow slit 12c, an airflow slit can be formed on the upper surface of the base portion 6. The closing valve system 10 is not limited only to the example that the float 12 as the valve body is moved by using a pressure difference. The closing valve system could be constructed in such a way that a valve body located in the breather pathway 8 is pressed in an opening-valve direction (a downward direction in FIG. 1) by an elastic member such as a spring, and when the inner pressure of the gear box 2 ascends more than the outer pressure of the gear box 2 beyond an acceptable range, the valve body is made move in a closing-valve direction (the upward direction in FIG. 1). Alternatively, The closing valve system could be constructed in such a way that a valve body made of elastic member, such as a reed valve, is set in the breather pathway, and the open and close of the breather pathway are switched to each other in accordance with the pressure difference, by using an elastic force of the valve body. The vehicle where the gear device of the present invention is mounted is not limited only to a high-speed railroad vehicle, but also the present invention can be applied appropriately to a car vehicle or other kinds of vehicle as long as the same problem as the present invention occurs due to high-speed running.

REFERENCE SINGS LIST

1 A gear device for electric device
2 A gear box
5 A breather device
6 A base portion
7 A breather cap
8 A breather pathway
10 A closing valve system
11 A flow chamber (a valve chamber)
12 A float (a valve body)
14 A filter

The invention claimed is:

1. A gear device for an electric motor which is combined with the electric motor installed in a vehicle, wherein
a breather pathway is provided in a gear box where a row of gears for transmitting force of the electric motor is contained, the breather pathway connecting between an inside and outside of the gear box, and in the breather pathway, a closing valve system including a valve chamber and a valve body contained within the valve chamber so as to move vertically, the valve body is provided to, when an outer pressure of the gear box is lower in comparison to an inner pressure of the gear box to such a degree that the valve body is moved, close the breather pathway by the valve body being moved, wherein the breather pathway includes a first pathway extending vertically and a second pathway extending vertically and communicating with an upper side of the first pathway, the valve chamber is formed by combining a first enlarged portion which is an upper portion of the first pathway and a second enlarged portion which is a lower portion of the second pathway, the valve body has a valve axis to enter the first enlarged portion; and a flange provided so as to be enlarged outward in a diameter direction from an upper end of the valve axis, the flange having an outer diameter which is smaller than an inner diameter of the second enlarged portion, and also at least a portion of the outer diameter being bigger than an inner diameter of the second pathway and bigger than an inner diameter of the first enlarged portion, and having at least one airflow slit formed on a bottom surface of the flange, a horizontal cross sectional surface of the valve body being circular;

a base portion is provided in a circumferential direction of the first enlarged portion, the base portion having an upper surface to connect to the bottom surface of the at least a portion of the flange where the outer diameter is bigger than an inner diameter of the first enlarged portion when the valve body descends in the valve chamber by the valve body's own weight, and the closing valve system is constructed so that when the valve body descends in the valve chamber by the valve body's own weight, the first pathway and second pathway are connected via an aperture created by each of the airflow slits disposed between the upper surface of the base portion and the bottom surface of the flange connecting to each other and an aperture between the valve body and the valve chamber, and when the outer pressure is lower in comparison to the inner pressure to such a degree that the valve body is moved, the valve body ascends in the valve chamber to close the second pathway by an upper surface of the flange.

2. The gear device of the electric motor according to claim 1, wherein
the inner diameter of the first enlarged portion is smaller than the inner diameter of the second enlarged portion, and the outer diameter of the flange is bigger than the inner diameter of the first enlarged portion, and
the base portion is provided in an outer circumferential side portion of the first enlarged portion.

3. The gear device of the electric motor according to claim 1, wherein a filter is further provided in the breather pathway so as to be located at an outside of the gear box more outward than a location closed by the closing valve system.

4. The gear device of the electric motor according to claim 2, wherein a filter is further provided in the breather pathway so as to be located at an outside of the gear box more outward than a location closed by the closing valve system.

* * * * *